May 17, 1949.  W. M. SIMPSON  2,470,658
REEL ASSEMBLY
Filed Nov. 14, 1945
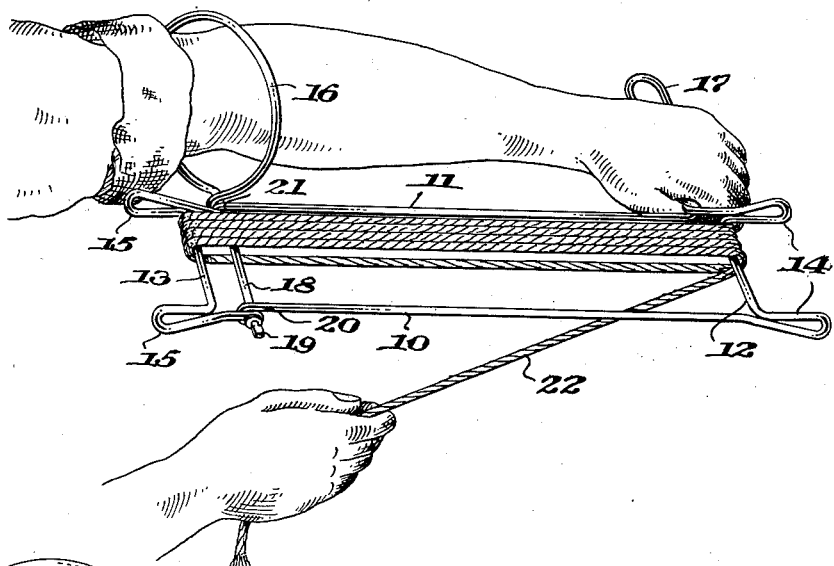
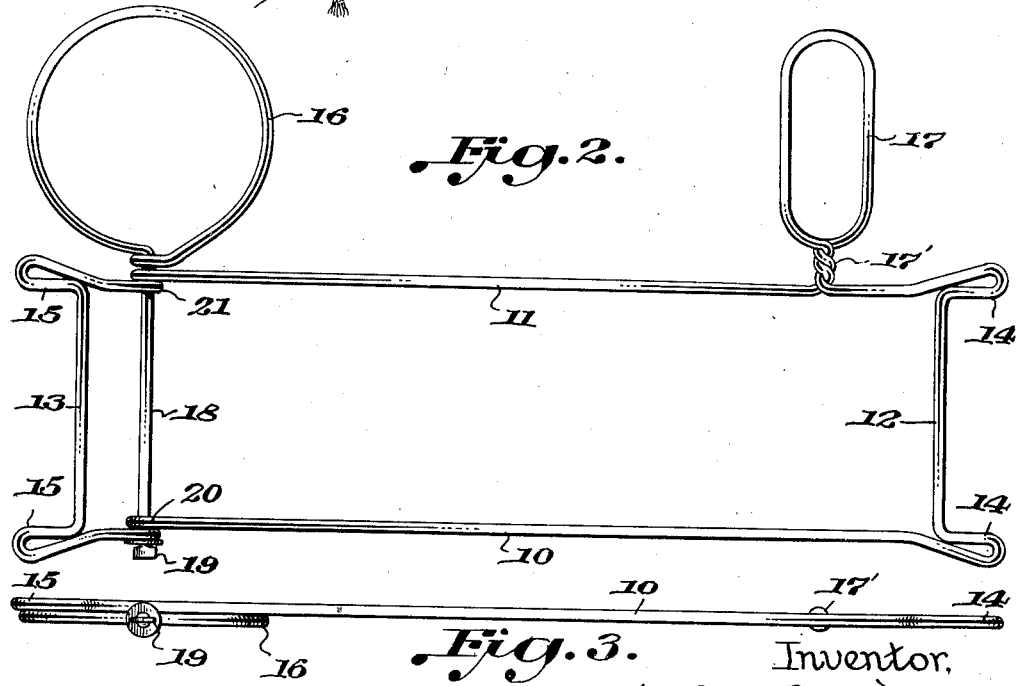
Inventor.
W. M. Simpson Patented May 17, 1949

2,470,658

UNITED STATES PATENT OFFICE 2,470,658

REEL ASSEMBLY

Walter M. Simpson, Evansville, Ind.

Application November 14, 1945, Serial No. 628,448

3 Claims. (Cl. 242—96)

This invention relates to reel assemblies, and more particularly to a device of this character by means of which the reel or other object may be supported upon an arm of an individual with the other hand free.

It is an object of the invention to provide a holder assembly of simple, inexpensive, construction susceptible of easy production and which may readily be held on the forearm without clamping.

Further objects and advantages of the invention will be apparent from the following description taken in conjunction with the drawings, wherein:

Fig. 1 is a perspective illustrating one embodiment of the invention and its application;

Fig. 2, a top plan view; and

Fig. 3, a view taken at right angles to that of Figs. 1 and 2.

Referring to the drawings, the invention comprises a reel frame consisting of right and left sides 10 and 11, and forward and rear ends 12 and 13 having ears 14 and 15 respectively for limiting the sidewise movement of material wound around the ends 12 and 13.

The reel frame is provided with a loop 16 which forms an arm guide and is provided with another loop 17 which forms a handle adapted to be gripped by the hand after the arm is extended through the loop 16 to thus support the reel frame on the forearm.

As shown the body of the device may be formed of a single piece of wire with the various parts substantially in a single plane, the wire between the body of the frame and the handle preferably being twisted for strength and appearance. The arm guide is formed of a separate piece of material, including the loop 16 and a straight axis or shaft portion 18 having a flattened extremity 19 for retaining it in loops 20 and 21 in which it is rotatably journalled.

Instead of the body being formed of a single piece of wire it may be formed of a plurality of pieces of wire or of other desired material or construction.

As shown in Fig. 1, a rope 22 or other object may be wound around the body of the reel after the reel assembly is in position upon the forearm of an individual. In order to place the reel assembly in operative position the hand and forearm of the individual are inserted through the arm guide 16 and, the handle 17 is held in the hand.

In this operative position the arm guide 16 will be disposed substantially at right angles to the body of the reel, but when the arm is removed it may be turned 90° so that it lies substantially in the plane of the body of the reel so that the parts are in a collapsed flat position.

It will be readily understood that a reel assembly in accordance with the present invention will be of particular use in various ways and it will be obvious to those skilled in the art that various changes may be made in the invention without departing from the spirit and scope thereof and therefore the invention is not limited by that which is shown in the specification, but only as indicated in the appended claims.

What is claimed is:

1. A reel assembly comprising an elongated body formed of a single piece of wire providing a skeleton frame having spaced substantially parallel end portions about which material is adapted to be wound, said end portions being provided with ears at their extremities for limiting the lateral disposition of the material wound on the reel, an integrally formed elongated handle having a twisted connection with the reel body adjacent one end of the same, a circular arm guide rotatably journalled on the same side of the reel body as the handle and adjacent the opposite end of the reel body for receiving the forearm of an individual with the handle gripped in the hand, said arm-guide being rotatable to a position to bring it into substantially the plane of the handle of the body and the reel.

2. A reel assembly comprising an elongated body including a skeleton frame having spaced portions about which material is adapted to be wound, said skeleton body being formed of a single piece of wire with said spaced portions being disposed in substantially parallel relation, and with ears provided at the extremities of the same for limiting the lateral disposition of the material wound on the reel, an integrally formed elongated handle portion adjacent one end of the reel body, a circular arm guide rotatably journalled on the same side as the handle in the frame of the reel body adjacent the opposite end of the same whereby the arm may be extended through the arm guiding portion and the handle gripped, and when the arm is retracted permitting the arm guiding portion to be rotated to bring it in a position substantially in the plane of the handle and body of the reel.

3. A reel assembly comprising an elongated body including a skeleton frame having spaced portions about which material is adapted to be wound, said spaced portions being disposed in substantially parallel relation and with ears provided at the extremities of the same for limiting the lateral disposition of the material wound on said reel, an elongated handle portion adjacent one end of the reel body, a circular arm guide rotatably journalled on the same side as the handle on the frame of the reel body adjacent the opposite end of the same whereby the arm may be extended through the arm guiding portion and the handle gripped, and when the arm is retracted permitting the arm guiding portion to be rotated to bring it in a position substantially in the plane of the handle and body of the reel.

WALTER M. SIMPSON.

REFERENCES CITED

The following references are of record in the file of this patent:

UNITED STATES PATENTS

| Number | Name | Date |
| --- | --- | --- |
| 453,119 | Keleher | May 26, 1891 |
| 523,853 | Foster | July 31, 1894 |
| 1,439,726 | Brown | Dec. 26, 1922 |